United States Patent Office 2,891,840
Patented June 23, 1959

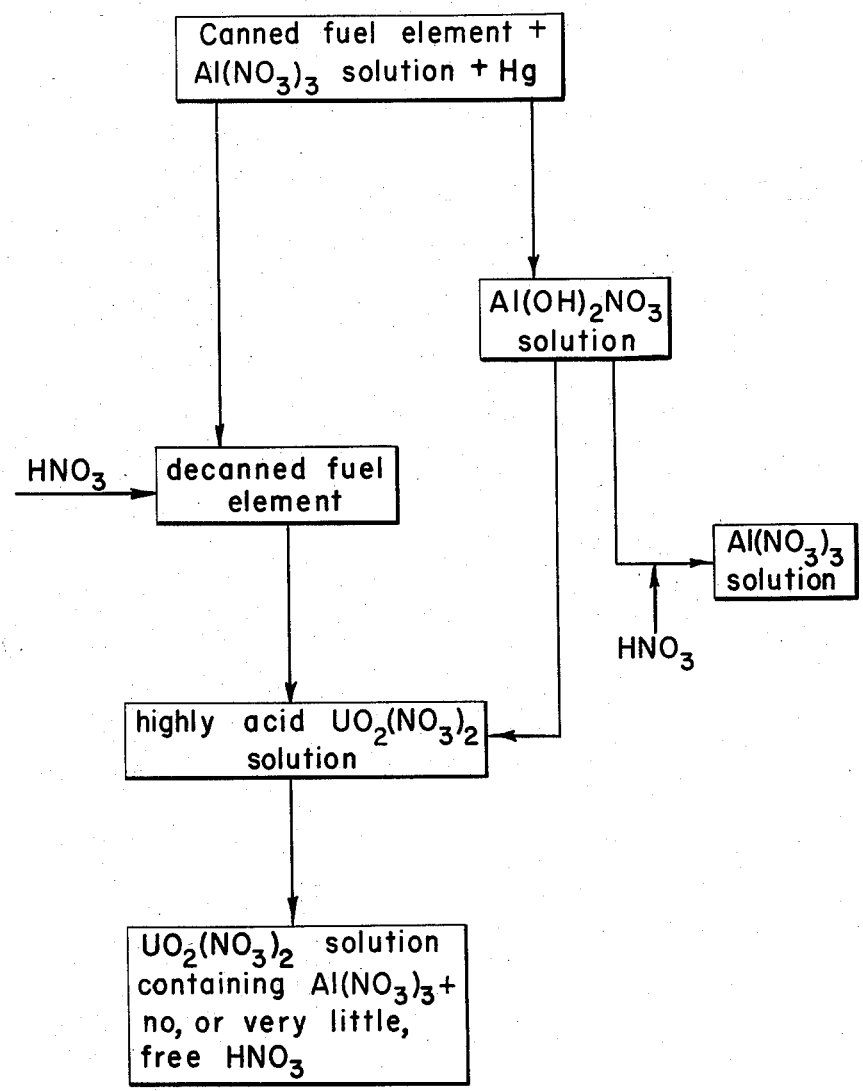

2,891,840

METHOD OF PROCESSING NEUTRONIC REACTOR FUEL ELEMENTS

Martin H. Curtis, Richland, Wash., assignor to the United States of America as represented by the United States Atomic Energy Commission Application February 28, 1956, Serial No. 568,416

5 Claims. (Cl. 23—14.5)

This invention deals with a method of processing irradiated fuel elements of neutronic reactors and in particular, with a method of decanning and dissolving aluminum-canned uranium- or thorium-containing fuel elements.

It is usually desirable to recover from the neutron-irradiated fuel elements the plutonium and the uranium or thorium in a pure form free from fission products so that these metals can be used or reused; for such processing dissolution of the irradiated material is required. Prior to dissolving the fuel material, though, the jacket or cladding has to be removed or, as it is called, the fuel element has to be decanned.

Caustic solutions, such as a sodium hydroxide solution, have been used heretofore for dissolving the aluminum jacket, and the irradiated fuel proper or core was then dissolved with acid, preferably nitric acid. The caustic solution-aluminum reaction has the disadvantage of hydrogen development and thus of explosion hazard; sodium nitrate has to be added in that case to convert the hydrogen to ammonia.

In other processes used heretofore the aluminum is dissolved in nitric acid in the presence of a mercury catalyst; hydrogen is freed also in this reation in great quantities. Aluminum dissolves very slowly in concentrated nitric acid, for instance, in a 60% acid, even when a mercury catalyst is present, and for this reason dilute nitric acid, for instance, in a concentration of 23%, has to be used.

Uranium, in contradistinction to aluminum, requires a concentrated nitric acid for satisfactorily fast dissolution. On the other hand, though, it is desirable, for further processing, for instance, for solvent extraction, that the uranium solutions obtained, the "product solutions," have a low acidity. This would mean that in order to accomplish the latter object, namely a low-acidity product solution, a rather long period of time has to be allowed for dissolving. The situation is similar in regard to thorium.

It is an object of this invention to provde a process for the dissolution of aluminum-canned fuel elements of neutronic reactors which proceeds rapidly.

It is also an object of this invention to provide a process for the dissolution of aluminum-canned fuel elements by which, in the first step, a complete dissolution of the can or cladding is obtained with no dissolution of the core so that no loss of core material occurs.

It is another object of this invention to provide a process for the dissolution of aluminum-canned fuel elements of neutronic reactors wherein very little hydrogen is developed and consequently no explosion danger exists.

It is another object of this invention to provide a process for the dissolution of aluminum-canned fuel elements of neutronic reactors whereby no ammonia-containing off-gases are evolved.

Finally, it is also an object of this invention to provide a process for the dissolution of aluminum-canned fuel elements of neutronic reactors which is inexpensive and simple.

It was found that aluminum is rapidly dissolved in an aqueous solution of aluminum nitrate, $Al(NO_3)_3$, containing a small group of mercury nitrate as a catalyst; a basic aluminum nitrate is formed in this reaction.

The process of this invention utilizes this finding. It comprises dissolving the aluminum in an aqueous solution containing aluminum nitrate in quantities so that basic, preferably dibasic, aluminum nitrate is obtained, then dissolving the uranium- or thorium-containing core in concentrated nitric acid, whereby a core metal nitrate solution is formed, and finally, adding at least part of the dibasic aluminum nitrate solution obtained in the first step to the core metal nitrate solution obtained until the acidity is reduced to the desired value.

More specifically, the process of this invention comprises immersing the neutron-irradiated aluminum-canned fuel element in an aqueous acid-free solution of aluminum trinitrate in the presence of a small quantity of mercury nitrate as catalyst whereby the aluminum is dissolved and a solution of dibasic aluminum nitrate, $Al(OH)_2NO_3$, is formed, immersing the core of the fuel element in an excess quantity of concentrated nitric acid whereby it is dissolved and a solution of core metal nitrate is formed, and adding at least part of said solution of dibasic aluminum nitrate to said core metal nitrate solution whereby excess nitric acid is neutralized. Any of the basic aluminum nitrate solution not used for conditioning the core metal solution can be converted to aluminum trinitrate by adding nitric acid thereto, and the aluminum trinitrate solution may then be recycled or used for dissolving a new supply of cans from irradiated slugs.

The process of this invention has the advantage that a concentrated nitric acid and an excess thereof over the stoichiometric amount required can be used for dissolving the core metal so that this step does not have to be carried out at a stage where a great part of the nitric acid has been consumed and where consequently the remaining nitric acid is very dilute and the dissolution very slow. In the process of this invention even the last phase of dissolution proceeds rapidly. The subsequent addition of basic aluminum nitrate solution takes care of any amount of free nitric acid undesirable for later processing. By this a reduction of dissolving time by about 25% is accomplished as compared with the time required when dilute nitric acid is used for dissolving the core metal.

Anothre important advantage is that the aluminum nitrate solution does not dissolve any core metal at all, in contradistinction to when nitric acid is employed for this purpose, so that no losses in valuable core metal occur.

The solutions obtained by the process of this invention are suitable for the various processing and recovery methods customary in the art. The aluminum nitrate-containing uranium or thorium solutions lend themselves particularly well to solvent extraction recovery processes, because the aluminum nitrate is a welcome ingredient; it functions as a salting-out agent during extraction of the uranium or thorium values, for instance into hexone, tributyl phosphate or the like.

The attached drawing contains a flow sheet which illustrates one preferred embodiment of the process of this invention as applied to the dissolution of aluminum-clad uranium fuel elements. This flow sheet is self-explanatory. The process when applied to thorium fuel elements is substantially the same as will be obvious later from the examples.

The concentration of aluminum nitrate for dissolving the aluminum can may vary widely; however, a solution 1.5 M in aluminum nitrate was the preferred concentration. About one mole of aluminum nitrate is necessary for one mole of aluminum, but a slight excess up to about 10% gave best result. The amount of catalyst yielding the most favorable dissolution was 5% by weight of mercury nitrate of the weight of jacket aluminum.

For the dissolution of the core nitric acid ranging between 30 and 60% was found suitable, a concentration of 45% yielding the best results. The concentration, during the dissolving step, was maintained at this high level by adding from time to time a 60% nitric acid. These are the conditions used for dissolving a uranium-containing core; in the case of a thorium-containing core fluoride anion was advantageously added as a catalyst in a quantity to yield a concentration between 0.01 and 0.1 M, preferably 0.3 M.

For conversion of the basic aluminum nitrate to aluminum trinitrate nitric acid of varying concentrations can be added; it was preferred, though, either to add the nitric acid in a concentration of about 28% or else to add a 60% nitric acid followed by water sufficient to obtain a 28% nitric acid.

All reactions were carried out at the boiling temperatures of the respective solutions. This amounted to a temperature of between 100° and 104° C. for dissolving the aluminum jacket and of 110° C. in the case of a 45% and of 115° C. in the case of a 60% nitric acid for dissolving the core metal; as the concentration of nitric acid was reduced due to consumption by the core metal, the boiling temperature went down to about 100° C.

In the following, two examples are given to illustrate the new process without the intention to limit the invention to the details given therein.

*Example I*

A uranium slug 4″ long, 1.385″ in diameter, weighing 1,778 grams and clad with a total of 59 grams of aluminum, namely a 25-mil thick layer around the axis and 0.185″ thick end caps on the top and the bottom and another uncanned uranium slug of the same core dimensions were placed in a dissolver and covered there with 1600 ml. of a 1.5 M aluminum nitrate solution which contained 2.95 grams of mercury nitrate, $Hg(NO_3)_2 \cdot 2H_2O$. The content of the dissolver was brought to boiling temperature and maintained there for 3 hours; the aluminum cladding was dissolved thereby, and 1580 ml. of a solution of basic aluminum nitrate was obtained. This solution was 2.5 M in Al and 4.4 M acid-deficient; its specific gravity was 1,254.

The two uranium cores were then covered with 600 ml. of a 45% nitric acid, and the container was heated to boiling of the acid. From time to time a 60% nitric acid was added to maintain the concentration of 45%; a total of 900 ml. of the 60% nitric acid was necessary. After 6½ hours the undissolved remainders of the cores were removed from the solution, and the process was repeated using again 600 ml. of 45% and 900 ml. of 60% nitric acid at boiling temperature for 6½ hours. After this the uranium had been completely dissolved, and 3000 ml. of uranyl nitrate solution 2.52 M in U and 1.3 M in $HNO_3$ was obtained; it had a specific gravity of 1.840.

A part, namely 755 ml., of the basic aluminum nitrate solution was added to the uranyl nitrate solution whereby it was made 2.0 M in U, 0.5 M in Al and 0.2 M in $HNO_3$; a specific gravity of 1.733 was obtained thereby.

The other 825 ml. of the basic aluminum nitrate solution were mixed with 775 ml. of a 28% nitric acid whereby the basic aluminum nitrate was converted to aluminum trinitrate. This solution, after addition of mercury nitrate, could be used for decanning new uranium slugs.

*Example II*

A thorium slug 4″ long, 1.385″ in diameter, weighing 1075 grams and clad with a total of 59 grams of aluminum like the slug used in Example I and another uncanned thorium slug of the same dimensions were placed in a dissolver and covered there with 1600 ml. of a 1.5 M aluminum nitrate solution which contained 2.95 grams of mercury nitrate. The content of the dissolver was brought to boiling temperature and maintained there for 3 hours; the aluminum cladding was dissolved thereby, and 1580 ml. of a solution of basic aluminum nitrate was obtained. This solution was 2.85 M in Al and 3.56 M acid-deficient.

The two thorium cores were then covered with 800 ml. of a 45% nitric acid 0.03 M in sodium fluoride, and the container was heated to boiling of the acid. From time to time a 60% nitric acid was added to maintain the concentration of 45%; a total of 700 ml. of the 60% nitric acid was necessary. After 8 hours the remainders of the cores were removed from the solution, and the process was repeated using again 800 ml. of the 45% and 700 ml. of the 60% nitric acid at boiling temperature for 8 hours. After this the thorium had been completely dissolved, and 3000 ml. of a thorium nitrate solution 1.54 M in thorium and 0.5 M in nitric acid was obtained.

The basic aluminum nitrate solution was used similarly as shown in Example I, namely, one part was added to the thorium nitrate solution for neutralization and one part was converted to aluminum trinitrate for reuse.

It will be understood that the process of this invention is not to be limited to the details given herein but that it may be modified within the scope of the appended claims.

What is claimed is:

1. A process of decanning and dissolving a neutronic reactor fuel element having a core containing a metal selected from the group consisting of uranium and thorium and a jacket of aluminum, comprising immersing the fuel element in an aqueous mercury nitrate-containing aluminum nitrate solution; heating the solution in contact with the fuel element whereby the jacket is dissolved and a solution of basic aluminum nitrate is formed; immersing the core in an excess quantity of concentrated nitric acid at elevated temperature whereby it is dissolved and a solution of core metal nitrate is formed; adding of said basic aluminum nitrate solution to said core metal nitrate solution whereby excess nitric acid is neutralized and the core metal nitrate solution is conditioned for further processing.

2. The process of claim 1 in which the remaining part of the basic aluminum nitrate solution not added to the core metal nitrate solution is mixed with nitric acid and converted thereby to aluminum trinitrate and said aluminum trinitrate is recycled to the jacket-dissolving system.

3. The process of claim 1 in which said dissolving reactions are carried out at boiling temperature of the solution.

4. The process of claim 1 in which the core metal is thorium and the nitric acid for dissolving the thorium contains fluoride anion as a catalyst.

5. The process of claim 1 in which about 1 mole of aluminum nitrate is used for dissolving 1 mole of aluminum and about 5% by weight of mercury nitrate of the aluminum is added to the aluminum nitrate solution.

References Cited in the file of this patent

UNITED STATES PATENTS 2,196,016    Huehn et al. _____ Apr. 2, 1940

OTHER REFERENCES

Le Bon: The Evolution of Matter, The Walter Scott Pub. Co., New York (1907), pp. 405, 408–411.

Mellor: A Comprehensive Treatise on Inorganic and Theoretical Chemistry, Longmans, Green & Co., vol. 12 (1932), p. 32.

Smyth: A General Account of the Development of Methods of Using Atomic Energy for Military Purposes Under the Auspices of the U.S. Government (1940–1945), pp. 87, 103.

Seaborg et al.: The Actinide Elements, p. 76 (1954), publ. by McGraw-Hill Book Co., N.Y.